United States Patent [19]

Gärtner

[11] 4,322,987
[45] Apr. 6, 1982

[54] SCREW DRIVE

[76] Inventor: Robert Gärtner, Freiherr vom Stein Strasse 8, 6308, Butzbach Hessen, Fed. Rep. of Germany

[21] Appl. No.: 129,994

[22] Filed: Mar. 13, 1980

[51] Int. Cl.³ .................... F16H 1/18; F16H 27/02
[52] U.S. Cl. .................. 74/424.8 R; 74/89.15
[58] Field of Search .............. 74/89.15, 424.8 R

[56] References Cited

U.S. PATENT DOCUMENTS

| | | | |
|---|---|---|---|
| 2,233,915 | 3/1941 | Conrad | 74/424.8 R |
| 2,482,082 | 9/1949 | Wahlberg | 74/424.8 R |
| 2,940,322 | 6/1960 | Uhing | 74/22 R |
| 3,614,900 | 10/1971 | Wahlberg | 74/424.8 R |
| 3,698,258 | 10/1972 | Gartner | 74/424.8 R |

FOREIGN PATENT DOCUMENTS 2809954  9/1978  Fed. Rep. of Germany ..... 74/22 R

Primary Examiner—Lawrence J. Staab
Attorney, Agent, or Firm—Becker & Becker, Inc.

[57] ABSTRACT

A screw drive with a spindle and a frame surrounding the spindle. The frame includes head and foot plates through which the spindle passes, and the screw drive includes at least one collar bearing arranged eccentrically to the spindle axis and supported by resilient frame parts. An annular bead or toroid arranged on the inner ring of the bearing engages in the thread of the spindle, whereby the collar bearing is pivotal about an axis located in the direction of the eccentricity thereof with respect to the spindle axis. The collar bearing surrounding the spindle is journalled at right angles to the spindle axis in two leaf springs which either form oppositely located longitudinal side walls of the frame, or which are located in the plane of the longitudinal side walls.

10 Claims, 3 Drawing Figures

SCREW DRIVE

The present invention relates to a screw drive with a spindle and a frame surrounding the spindle. The frame includes a head plate and likewise a foot plate through which the spindle passes. The screw drive also includes at least one roller ring or collar bearing supported by resilient frame parts and arranged eccentrically with respect to the spindle axis and having a torus or annular bead provided on the inner ring of the bearing and engaging in the thread of the spindle, while the collar bearing is pivotable about an axis located in the direction of the eccentricity thereof to the spindle axis.

German Offenlegungsschrift No. 1,949,049 discloses a screw thread having a threaded spindle and at least one collar bearing. This bearing is rotatably journalled in a frame axially movable with respect to the spindle, and is inclined to the spindle axis; the outer peripheral rib of the collar bearing engages in the spindle thread, while the collar bearing is yieldably held by spring elements on the frame in the axial direction of the collar bearing or in the axial direction of the spindle.

German Offenlegungsschrift No. 2,262,062 discloses a screw drive with a spindle, according to which a collar bearing eccentrically surrounds the spindle, and the torus of the inner ring engages in the thread windings of the spindle. In this case, the collar bearing which is inclined to the spindle axis is pivotable in the frame about an axis located in the direction of eccentricity with respect to the spindle axis.

These heretofore known embodiments of screw drives have proven useful, but in part they cannot transmit very large loads, and the frame and the parts arranged therewith, when such loads are to be transferred, occupy a considerable space which frequently is not available along the spindle. Such a situation is especially disadvantageous when the spindle has a length of several meters and the space around the spindle is limited.

It is an object of the present invention to create a screw drive of the initially mentioned type with which, on the one hand, a high load transfer is possible and, on the other hand, however, the frame and parts arranged therewith only occupy and require a small space. The frame and the parts arranged therewith additionally are to be of a simple construction.

These and other objects and advantages of the present invention will appear more clearly from the following specification in connection with the accompanying drawing, in which.

Figure 1:
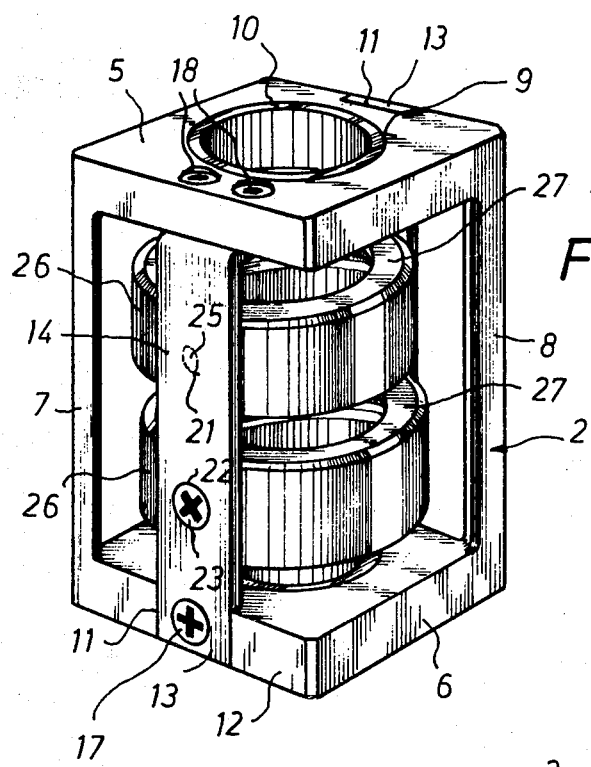
FIG. 1 is a view of the frame of the drive.

The screw drive of the present invention is characterized primarily in that the collar or roller ring bearing, which surrounds the spindle, is journalled at right angles to the spindle axis in two leaf springs which either form longitudinal side walls of the frame located across from each other, or which are located in the plane of the longitudinal side walls of the frame. If both end plates, which have been referred to as head plate and foot plate and which may represent two parallel vertical plates, depending on the position of the frame, are embodied in a circular or oval configuration, it is in accordance with the basic concept of the present invention to arrange both leaf springs diametrically across from each other along the narrow side or the longer side of the oval, or to arrange the leaf springs diametrically across from each other at any location. With square end plates, it is also within the scope of the present invention to arrange both leaf springs at the corners of the square plates, so that the springs lie parallel to the diagonal of both plates within the periphery of the plates or only with small projection therebeyond.

In a further embodiment of the present invention, at least one of the two pivot-axis studs or pins of the collar bearing is axially shiftable in its leaf spring. The second axis pin of the same collar bearing can be connected with the second spring in the axial direction of the stud or pin.

The collar bearing preferably can be received by a support or carrier ring with coaxial pins or studs located diametrically across from each other, whereby the carrier ring, at one of its end faces, is provided with an inwardly directed flange against which the adjoining end face of the inner and outer ring of the collar bearing engage.

In a further advantageous embodiment of the present invention, the leaf springs are connected with the head or foot plate by means of an inwardly bent end. Furthermore, the frame can receive at least two collar bearings, whereby the leaf springs are arranged axially symmetrically with respect to the transverse central plane of the frame. Actually it is known from the foreign reference AT-Pat. No. 258,663 and U.S. Pat. No. 2,488,256 to have several circularly arranged collar bearings from the outside symmetrically engage in the thread of the spindle. It is also known to arrange several collar bearings in the longitudinal direction of the spindle, whereby the collar bearings are arranged with their eccentricities angularly displaced with respect to each other relative to the spindle axis. Consequently, with the present inventive screw drive, protection for the aforementioned features is only being claimed in combination or in connection with the remaining features of the present invention.

Both collar bearings likewise can be arranged axially symmetrical to the transverse central axis of the frame and both bearings can be suitably secured to the leaf springs. The spacing of the central axes of both bearings then corresponds to the double eccentricity of the individual collar bearings relative to the longitudinal axis of the spindle.

In a further embodiment of the present invention, the leaf spring end bent at the or into the plane of the head or foot plate can be held by a fastening means guided in an oblong hole located in the spring direction of the leaf spring. In this case, the axial stud or pin, adjoining that spring end which is bent at or into the plane of the head or foot plate, can be axially shiftable in the spring end.

Referring now to the drawing in detail, the inventive screw drive is formed essentially by the threaded spindle 1 and the frame 2 with the parts connected thereto. The thread of the spindle can be a square or semi-coarse tetragonal thread with the thread rib 3 and the thread groove 4.

Figure 3:
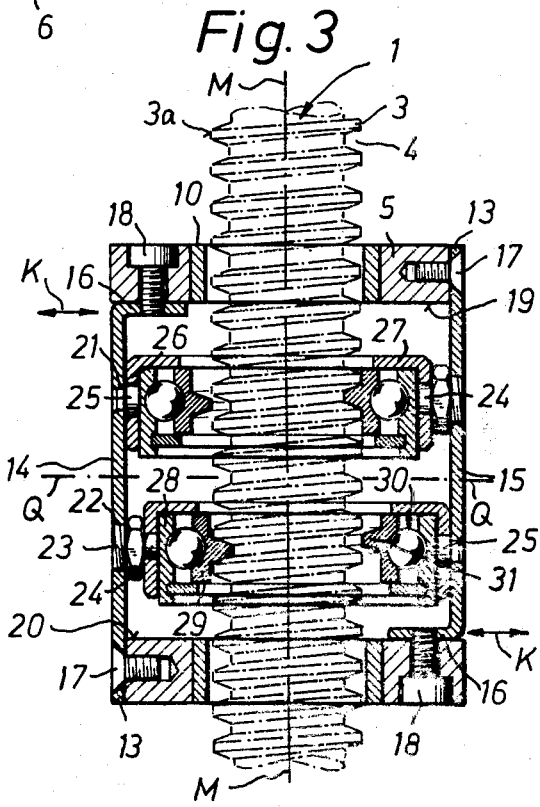
FIG. 3 is a vertical section through the frame with a spindle surrounded by the frame.

In the illustrated example, the frame 2 has a head plate 5 and a foot or base plate 6. These designations are likewise to be understood as end plates on both sides when the threaded spindle extends in a horizontal direction rather than in a vertical direction as illustrated in FIGS. 1 and 3. Both plates 5, 6 comprise rectangular pieces which are unitarily connected with each other by two struts 7, 8 located diametrically across from each other. The parts 5-8 inclusive can form a cast body. In the middle of each plate 5, 6 is a round bore 9 with an insert 10 arranged therein and consisting preferably of synthetic material. In place of this smooth-walled ring, the diameter of which corresponds approximately to the outer diameter of the thread rib 3 of the spindle 1 in such a way that the frame is guided by the ring 10 of each plate on the periphery 3a of the threaded spindle rib 3, there can also be provided a ring the inner side of which is provided with a thread engaging the thread of the threaded spindle 1.

Each of the plates 5, 6 has an outwardly open square recess 11, the depth of which corresponds to the thickness of the subsequently described leaf springs. The recesses are located axially symmetrically across from each other with respect to the transverse central plane Q of the frame 2 and are arranged in the center of the side wall 12 of the plates 5, 6. One end 13 of each of the leaf springs 14, 15 engages the recesses 11; both leaf springs 14, 15 are embodied identically, have an inwardly directed end 16 directed toward the spindle 1, and are likewise arranged axially symmetrically with respect to the transverse central plane Q of the frame 2. While the end 13 of both springs is respectively secured to the plate 5 or 6 by a screw 17 directed radially toward the spindle axis 1, the angled-off end 16 of each leaf spring 14, 15 is held on the plate 5 or 6 by one or two screws 18 extending parallel to the spindle axis 1. The length of the leaf springs is so dimensioned that the bent or angled-off ends 16 of the leaf spings 14, 15 engage upon the inner sides 19, 20 of the plates 5, 6, without the leaf springs 14, 15 being subjected to any particular longitudinal stress or tension or being curved inwardly or outwardly.

The ends 16 of both leaf springs 14, 15 are able to diverge slightly in the direction of the arrows K since the screws 18 in the plates 5, 6 are held in short oblong holes, the longitudinal axes of which extend in the direction of the arrows K.

Both leaf springs 14, 15 have coaxial bores 21, 22 preferably at equal spacing from the inner sides 18, 20 of the plates 5, 6; of these bores 21, 22, the larger bore 22 has a thread while the bore 21 is smooth-walled. Into the larger threaded bore 22 can be threaded the thread 23 of the axial pin or stud 24, while the axial pin or stud 25 projects into the smooth-walled bore 21 of both leaf springs. A support or carrier ring 26 is pivotally journalled upon the axial pins or studs 24, 25, and this ring 26 has an inwardly directed flange 27 against which engages one end face of the outer ring 28 and of the inner ring 29 of a collar bearing, generally designated 30. The inner ring 29 of the collar bearing 30 has a toroid or torus 31, the cross section of which corresponds to the cross section of the threaded groove 4, in which it engages while engaging the rib flanks. As apparent from FIGS. 2 and 3, both support rings 26 and the collar bearings thereof are located eccentrically with respect to the central longitudinal axis M of the spindle 1. Both collar bearings 30 have the same eccentricity since they are also arranged axially symmetrically to the transverse central axis Q of the frame 2 in which they are located.

Figure 2:
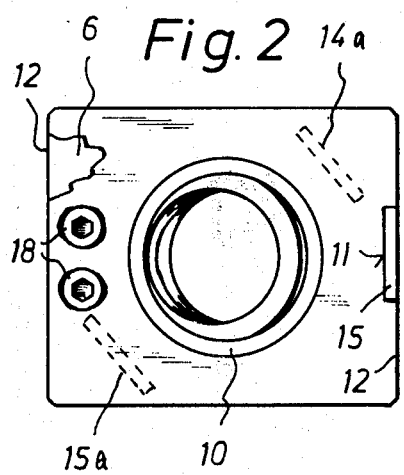
FIG. 2 is a plan view of the head or foot plate of the frame.

In place of the arrangement of both leaf springs 14, 15 on the sides of the frame 2, there can also be provided an equally effective embodiment with which the leaf springs are arranged at the corners of a square head and foot plate as indicated by the dashed lines 14a and 15a in FIG. 2.

The drawing illustrates that the frame 2, which serves as the thread nut, can be embodied in a unitary manner, and that the leaf springs 14, 15 holding the collar bearings can be identically embodied. The drawing also shows that the frame, in spite of the high force transfer, requires only a small space around the spindle, while the collar bearings are able to match or adapt their pivoting capability to the inclination or pitch of the spindle thread or path, and furthermore the possibility of a resilient adjustment of the collar bearings is attainable, so that an optimum engagement or rolling-off of the bead or torus 31 of the collar bearings against the thread of the spindle 1 is provided.

In the illustrated example of FIG. 3, the axial pin or stud 25 is freely shiftable in its bore 21 in the leaf springs 14, 15. Consequently, only one spring at a time is effective radially upon each collar ring or bearing which, by the axial pin or stud 24 screwed into a leaf spring, is radially connected therewith. This connection is always adjacent to the foot end 13 of the corresponding leaf spring 14 or 15, while the freely shiftable axial stud or pin 25 is adjacent to the bent spring end 16.

The present invention is, of course, in no way restricted to the specific disclosure of the specification and drawing, but also encompasses any modifications within the scope of the appended claims.

What I claim is:

1. A screw drive, which comprises in combination:
   a threaded spindle;
   a frame surrounding at least a portion of said spindle and including resilient parts;
   a head plate;
   a base plate, said spindle being adapted to pass through said head and base plates;
   at least one collar bearing supported by said resilient frame parts, arranged eccentrically with respect to the axis of said spindle, and including a radially inner ring provided with an annular bead for engaging the thread of said spindle, said at least one collar bearing being pivotal about an axis located in the direction of the eccentricity of said bearing to said spindle axis; and
   at least two leaf springs supported by said frame and forming at least a portion of said resilient frame parts, said at least one collar bearing surrounding a portion of said spindle and being journalled in said leaf springs at right angles to said spindle axis, the leaf springs being connected with the head and the base plates and the collar bearings being laterally displaceable at right angles to said spindle.

2. A screw drive in combination according to claim 1, in which at least one of said leaf springs includes a hole extending substantially at right angles to said spindle axis, and in which said at least one collar bearing includes at least one pivot pin which is axially displaceable in said hole.

3. A screw drive in combination according to claim 2, in which said at least one collar bearing includes a support ring for effecting support with said resilient frame parts, said support ring including coaxial diametrically oppositely located pivot pins.

4. A screw drive, which comprises:
   a threaded spindle;
   a frame surrounding at least a portion of said spindle and including resilient parts;
   a head plate;

a base plate, said spindle being adapted to pass through said head and base plates;

at least one collar bearing supported by said resilient frame parts, arranged eccentrically with respect to the axis of said spindle, and including a radially inner ring provided with an annular bead for engaging the thread of said spindle, said at least one collar bearing being pivotal about an axis located in the direction of the eccentricity of said bearing to said spindle axis; and two leaf springs supported by said frame and forming at least a portion of said resilient frame parts, said at least one collar bearing surrounding a portion of said spindle and being journalled in said leaf springs at right angles to said spindle axis, at least one of said leaf springs including a hole extending substantially at right angles to said spindle axis, said at least one collar bearing including at least one pivot pin which is axially displaceable in said hole, said at least one collar bearing including a support ring for effecting support with said resilient frame parts, said support ring including coaxial diametrically oppositely located pivot pins, each of said leaf springs being provided with an end directed inwardly toward said spindle axis, said ends being respectively connected with said head and base plates.

5. A screw drive according to claim 4, in which said two leaf springs form oppositely located longitudinal side walls of said frame.

6. A screw drive according to claim 4, in which said frame includes longitudinal side walls, said leaf springs being respectively arranged in the planes of said side walls.

7. A screw drive according to claim 4, which includes at least two collar bearings in said frame, which has a transverse central plane, said leaf springs being axially symmetrical to said central plane.

8. A screw drive according to claim 7, in which said at least two collar bearings are arranged axially symmetrical to said central plane and are mounted to said leaf springs.

9. A screw drive according to claim 4, in which said head and base plates include oblong holes situated in the spring direction of said leaf springs, and fastening means guided in said holes for holding said bent leaf spring ends, said ends being respectively bent at least at the planes of said head and base plates.

10. A screw drive according to claim 9, in which that pivot pin closest to said bent spring end is axially displaceable in said leaf spring.

* * * * *